United States Patent
Battles et al.

(10) Patent No.: US 7,580,076 B2
(45) Date of Patent: Aug. 25, 2009

(54) DEVICES AND METHODS FOR CALCULATING PIXEL VALUES REPRESENTATIVE OF A SCENE

(75) Inventors: Amy E. Battles, Windsor, CO (US); Jason Yost, Windsor, CO (US); John A. Mick, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 617 days.

(21) Appl. No.: 11/262,701

(22) Filed: Oct. 31, 2005

(65) Prior Publication Data

US 2007/0097254 A1    May 3, 2007

(51) Int. Cl.
H04N 5/235    (2006.01)
H04N 9/64    (2006.01)

(52) U.S. Cl. ............... 348/362; 348/229.1; 348/221.1; 348/246

(58) Field of Classification Search ......... 348/364, 348/362, 229.1, 208.12, 221.1, E5.037, 246, 348/301, 243, 247
See application file for complete search history.

(56) References Cited

U.S. PATENT DOCUMENTS

| | | | | |
|---|---|---|---|---|
| 5,309,243 A | * | 5/1994 | Tsai | 348/221.1 |
| 5,751,354 A | * | 5/1998 | Suzuki et al. | 348/349 |
| 6,859,230 B2 | * | 2/2005 | Luo et al. | 348/297 |
| 7,015,956 B2 | * | 3/2006 | Luo et al. | 348/229.1 |
| 7,053,954 B1 | * | 5/2006 | Canini | 348/362 |
| 7,403,222 B2 | * | 7/2008 | Bell et al. | 348/229.1 |
| 2001/0013903 A1 | * | 8/2001 | Suzuki et al. | 348/362 |
| 2003/0098914 A1 | * | 5/2003 | Easwar | 348/229.1 |
| 2008/0012975 A1 | * | 1/2008 | Sato et al. | 348/296 |

\* cited by examiner

*Primary Examiner*—Lin Ye
*Assistant Examiner*—Marly Camargo

(57) ABSTRACT

Methods of calculating pixel values representative of a scene are disclosed herein. One embodiment of the method comprises focusing light representative of the scene onto a photosensor for a period of time using at least one exposure setting, wherein the photosensor has a plurality of pixels. Numeric values corresponding to the intensity of light received by each of the pixels during the period are generated. At least one exposure setting is changed and pixel values are generated by the photosensor based on the changed at least one exposure setting are calculated. The number of calculated pixel values that are greater than a first preselected value are then determined.

18 Claims, 3 Drawing Sheets

DEVICES AND METHODS FOR CALCULATING PIXEL VALUES REPRESENTATIVE OF A SCENE

BACKGROUND

Digital cameras generate image data representative of a scene by the use of a photosensor, which has a plurality of pixels located thereon. Light from the scene is focused onto the pixels, causing each pixel to accumulate a charge. The charge is converted to a number, such as a binary number, for processing. The numbers are sometimes referred to as pixel values. The pixel values representative of the charges accumulated by the pixels may range, as an example, between zero and 255.

If a scene has bright portions, the pixels that image the bright portions may charge to their maximum value or become saturated. Accordingly, the pixel values representative of these pixels will be equal to or close to 255. Any range of brightness that could have otherwise been imaged by these pixels has been lost due to the saturation. These pixels are sometimes referred to as clipped pixels. When the image of the scene is replicated, the portion of the scene represented by the clipped pixels may appear very bright and without any brightness range or fluctuation. Thus, the replicated image appears unrealistic.

Clipped pixels may be the result of a very bright scene or overexposure. For example, bright spots in the image, such as glare, may cause the pixels imaging the bright spots to become clipped. An overexposed image will cause all the pixels to charge for a longer time than they would for a normally exposed image. Thus, all the pixel values will be greater than they would be for a normally or properly exposed image. The result may be that a significant number of pixel values become clipped, causing the replicated image to appear unrealistic.

DETAILED DESCRIPTION

Figure 1:
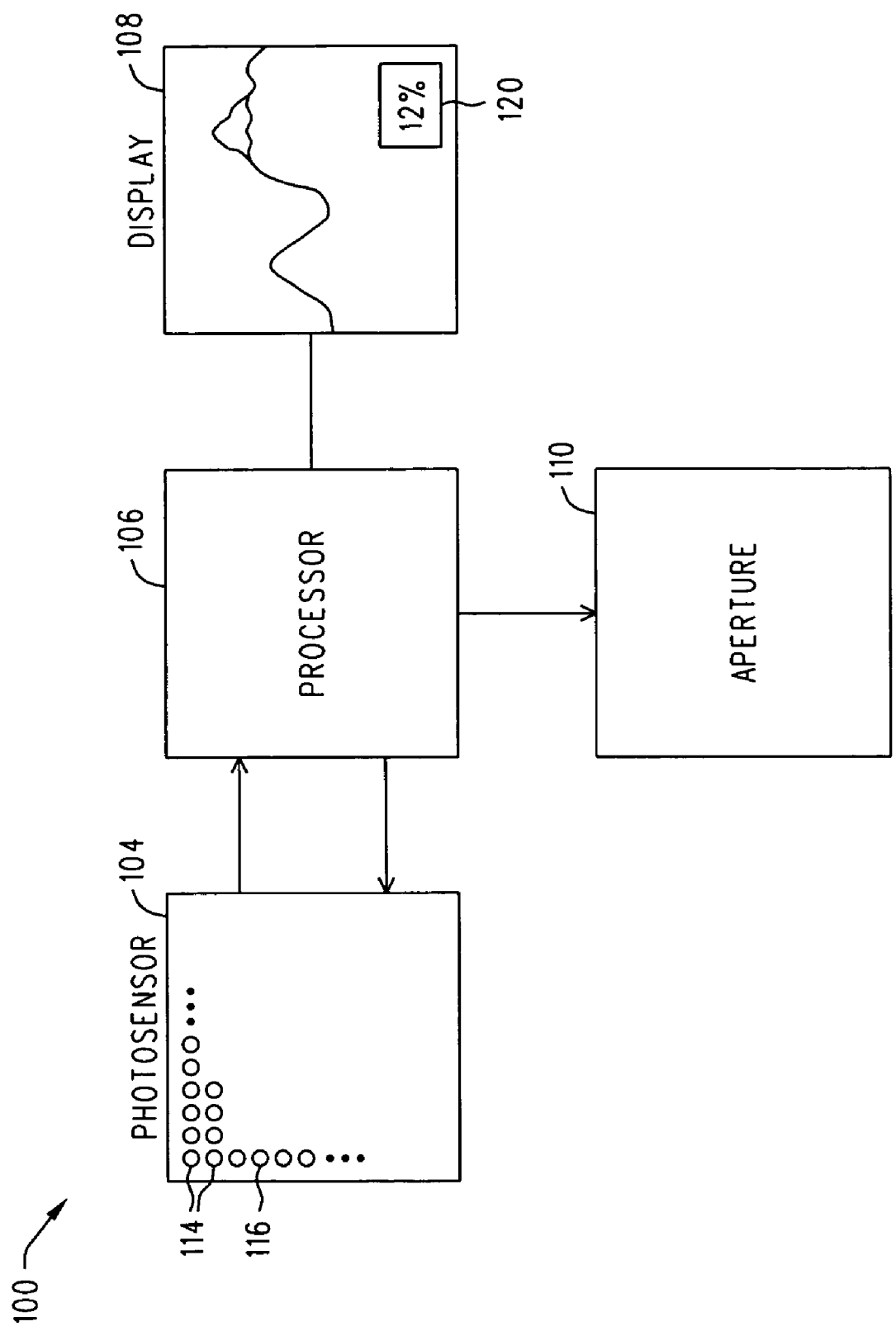
FIG. 1 is a schematic illustration of an embodiment of a digital camera.

FIG. 1 is a schematic illustration of an embodiment of a digital camera 100. The digital camera 100 includes a photosensor 104, a processor 106, a display 108, and an aperture 110. It is noted that digital cameras may include more components than those shown in FIG. 1. The photosensor 104 is a device, such as a charge-coupled device, that converts light to electric signals. The operation of the photosensor 104 is described in greater detail below. The processor 106 serves to operate the other devices within the digital camera 100 and to process data generated by the photosensor 104. The display 108 serves as a user interface for the digital camera 100. In addition, the display 108 may display scenes that have been captured by the digital camera 100. The aperture 110 may be controlled by the processor 106 and serves to regulate the amount of light incident on the photosensor 104.

The digital camera 100 generates image data representative of scenes that are focused onto the photosensor 104. The generation of image data is sometimes referred to as capturing an image. The image data is used to replicate images captured by the digital camera 100. Examples of replications are video displays of the images and printed pages of the images. The photosensor 104 has a plurality of photodetectors or pixels 114 located thereon. The term photodetector or pixel as used herein refers to a device located on the photosensor 104 that generates data representative of the amount of light received by the pixel over a preselected time, which is sometimes referred to as exposure time. Light incident on a pixel causes the pixel to accumulate a charge, wherein the rate that the charge accumulates is proportional to the intensity of incident light. The charging of the pixels 114 is described in greater detail below. The charges are converted to digital data, which is processed to image data or some other form of data that is able to be processed by the digital camera 100.

As briefly described above, the charges generated by the pixels 114 on the photosensor 104 are converted to digital values or numbers. The conversion may be accomplished by electronic devices located on the photosensor 104, the processor 106, or some converter located between the photosensor 104 and the processor 106, which is not shown. The numbers may be binary numbers between zero and 255. Numbers equal to or close to zero may be the result of pixels that accumulated little or no charge during image capture. As described in greater detail below, these pixels are referred to as dark pixels. Numbers equal to or close to 255 are the result of pixels that accumulated a maximum charge or close to a maximum charge during image capture. Pixels associated with values of 255 are referred to as clipped pixels. In some embodiments, pixels associated with values close to 255 or another maximum value are referred to as clipped pixels. It should be noted that dark pixels may be the result of a short exposure time and/or a small aperture setting and the clipped pixels may be the result of a long exposure time and/or a large aperture setting. Likewise, the dark pixels may be the result of imaging a very dark portion of the scene and the clipped pixels may be the result of imaging a very bright portion of the scene.

Figure 2:
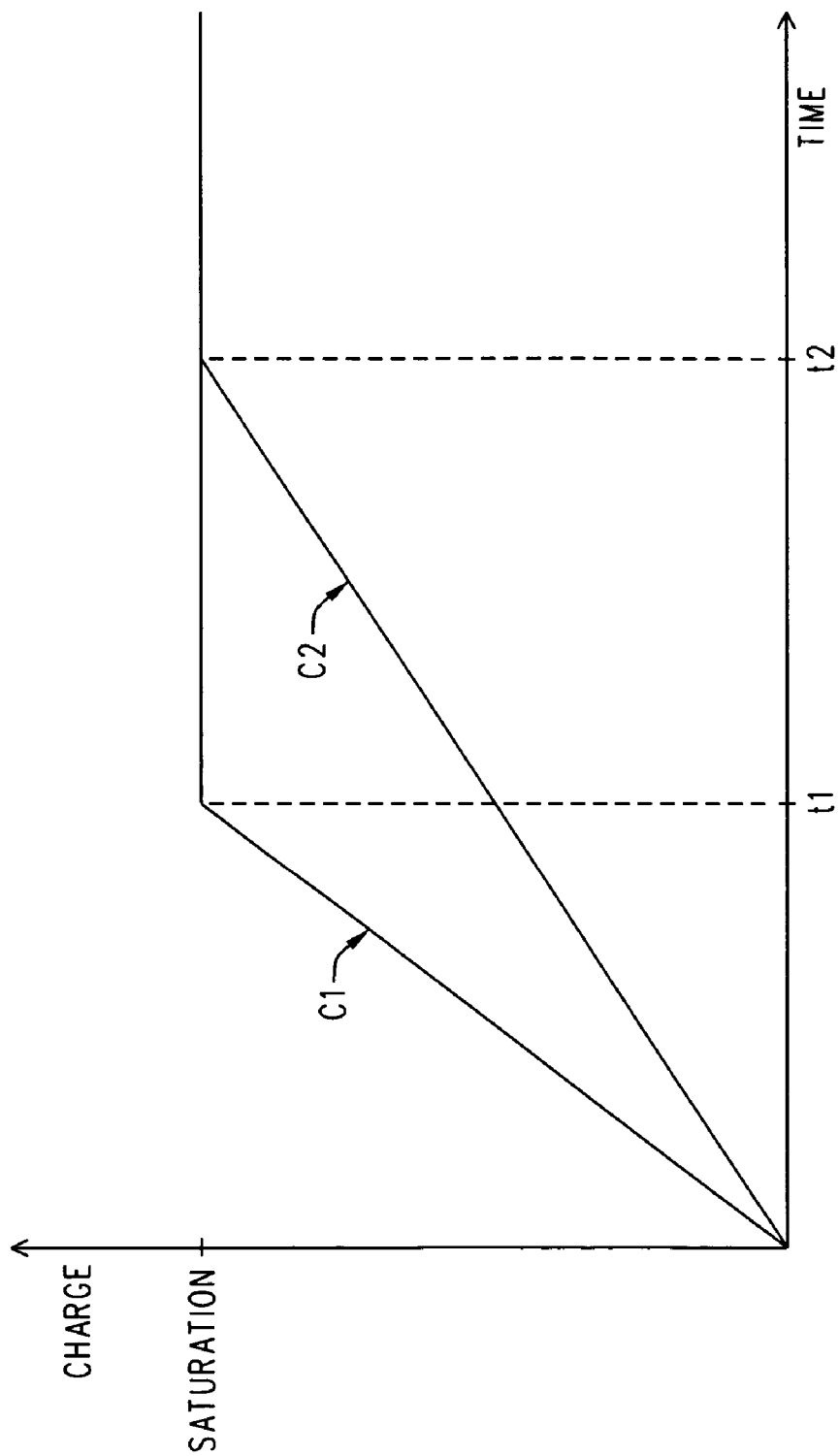
FIG. 2 is a graph depicting examples of a pixel accumulating charge under different incident light intensities.

With additional reference to FIG. 1, a graphical illustration of charge accumulation on a pixel 116 is shown in FIG. 2, wherein the pixel 116 is representative of any of the pixels 114 on the photosensor 104. The horizontal axis of FIG. 2 represents time and the vertical axis represents the charge. Thus, the graph represents charge accumulation over time. A saturation point is marked on the vertical axis and represents the maximum charge that may be accumulated by the pixel 116. When the pixel 116 accumulates this maximum charge, it is referred to as being clipped. Because clipped pixels have accumulated their maximum charge, they are no longer able to provide an indication as to the intensity of received light. When data representative of a clipped pixel is used to create an image, the portion of the image represented by the clipped pixel will appear as a bright spot.

A first line C1 on the graph of FIG. 2 depicts the charge rate of the pixel 116 when the pixel 116 is exposed to intense light. A second line C2 depicts the charge rate of the pixel 116 when it is exposed to a less intense light. The first line C1 has a greater slope than the second line C2 indicating that the pixel 116 is charging faster when it is exposed to intense light. The pixel 116 reaches saturation or becomes clipped at a time t1 when it is exposed to the intense light. The pixel 116 becomes clipped at a time t2, wherein t2 is greater than t1, when it is exposed to the less intense light. Thus, both exposure time and the intensity of light are variables that determine when a pixel will become clipped. It is noted that other camera settings, such as the aperture setting may also affect the charge rate of the pixels.

As stated above, clipped pixels are pixels that become saturated so that the the image data or binary numbers representative of the pixels are at a maximum value. Therefore, these clipped pixels are unable to distinguish the intensity of light focused on them. More specifically the data generated simply indicates that the image is bright without providing data indicative of the actual brightness. A dark pixel, on the other hand, is a pixel that has very little or no light focused on it. The charge accumulated by a dark pixel may be so close to the dark current of the pixel that the image data is extremely close to or indistinguishable from the dark current. A dark pixel may be the result of a very low intensity of light being focused onto the pixel or the exposure time being very short. Dark pixels will cause dark areas to appear on an image replicated using the image data.

Figure 3:
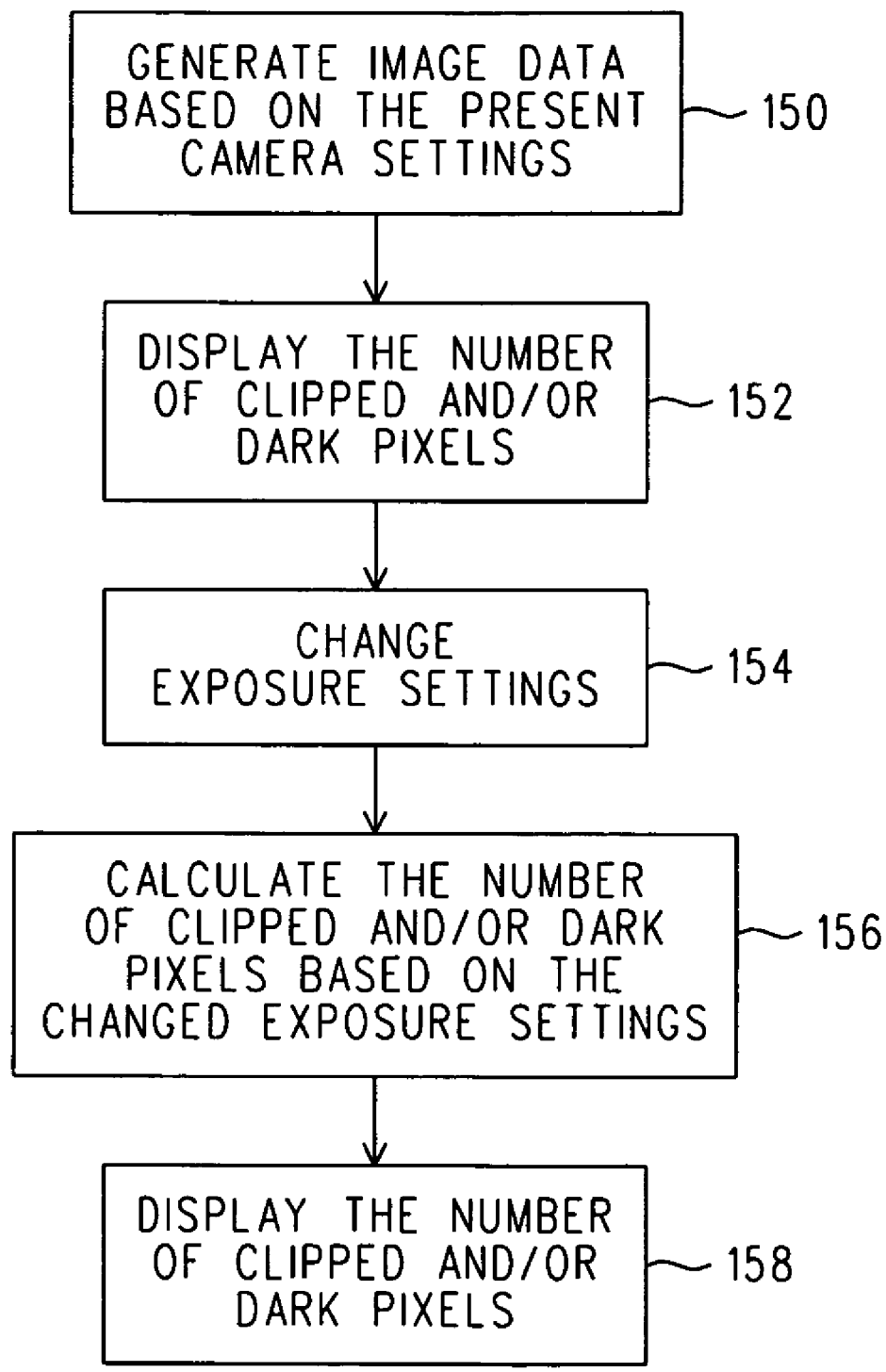
FIG. 3 is a flow chart showing an embodiment of determining the number of clipped and dark pixels under different exposure conditions.

Having described the components of the digital camera 100, FIG. 1, its operation will now be described. More specifically, the digital camera 100 will be described as it determines the number of pixels that may be clipped or dark under different exposure conditions. In some embodiments, the numbers of clipped and/or dark pixels are displayed on a region 120 of the display 108. A flow chart depicting an embodiment of the method is shown in FIG. 3.

With additional reference to FIG. 1, at step 150, image data of a scene is generated. In other words, the digital camera 100 captures the scene. This image data may be used as a base line for calculating the numbers of subsequent clipped and/or dark pixels because the camera settings are known when the image data was generated. For example, the exposure time, aperture, contrast, color balance, ISO speed or gain, brightness or exposure compensation, and other camera settings are known when the image data was generated.

At step 152, the number of clipped and/or dark pixels of the generated image data is displayed. For example, referring to FIG. 1, the region 120 of the display 108 may display this information. The displayed information may be in many forms. For example, the actual number of clipped and/or dark pixels may be displayed. In another embodiment, the percentage of clipped and/or dark pixels may be displayed. It is noted that in some embodiments, step 152 may be omitted.

At step 154 an exposure setting is changed. For example, the exposure time, f-stop (aperture), or other exposure setting may be changed. It is noted that in step 154 a plurality of exposure settings may be changed. At step 156, the number of clipped and/or dark pixels is determined based on the changed exposure settings. For example, the processor 106 of FIG. 1 may receive the data indicative of the changed exposure setting. Based on the setting, the processor 106 may change the values of the previously generated image data so as to reflect values based on the new exposure settings. The change in exposure settings may include a different exposure time, aperture setting, flash setting, in addition to other exposure settings. In general, exposure settings change the amount of light incident on the photosensor 106, which changes the charge accumulated on the pixels 114 during image capture.

In some embodiments, the changed exposure settings are used to capture an image and the number of clipped and/or dark pixels are calculated. In order to speed the time required to display the number of clipped and/or dark pixels, the camera may not use all the pixels 114, FIG. 1, on the photosensor. Accordingly, the captured image may sample the scene using the changed exposure setting.

In some embodiments, the number of clipped and/or dark pixels is calculated. The process of calculating clipped and/or dark pixels may include calculating the new pixel values based on one or more exposure setting changes. For example, a longer exposure time will likely increase all the pixel values.

Thus, the calculation involves adding a number to the binary numbers representative of all the pixel values. Pixel values greater than a preselected value, such as a value close to 255, may be deemed clipped. Likewise, if the exposure time is shortened, all the pixel values may be reduced. Accordingly, all the pixel values may be reduced in order to reflect the shorter exposure time.

Selection of the new pixel values may be accomplished by the use of mathematical functions or lookup tables. For example, a table may be established that includes the variation in pixel values for specific changes in exposure settings. More specifically, pixel values may increase or decrease a known amount when an exposure setting is changed from a first value to a second value. The change in exposure settings may be used in conjunction with the table and used as described above to calculate the numbers of clipped and/or dark pixels. In some embodiments, equations may be used to determine the number of clipped and/or dark pixels. In such embodiments, some of the camera setting used during the image capture may be variables in an equation that will calculate pixel values. As the exposure settings are changed, the variables in the equation change, which calculates pixel values based on the new exposure settings. Thus, clipped and dark pixels are readily determined and displayed as shown in step 158.

It is noted that changing an exposure setting so as to reduce the intensity of light or exposure time may cause clipped pixels of the originally captured scene to all have the same value. This is due to the pixel values being saturated, which causes them to lose all dynamic range. More specifically, clipped pixels will have a maximum value, such as 255, regardless of the intensity of light incident on the photosensor 104 or the exposure time. Thus, when lower pixel values are calculated, all clipped pixels may appear as not being clipped. Therefore, the methods described above may work better when the user increases the exposure time or intensity of light incident on the photosensor 104. Various methods may be used to more accurately calculate pixel values. For example, pixel values proximate the clipped pixels may be used to determine when the clipped pixels became clipped. This procedure may involve analyzing pixel values to determine whether the pixel values proximate the clipped pixels increase or decrease. The values of the clipped pixels may then be interpolated based on the proximate pixel values.

The display of the numbers of clipped and/or dark pixels enables a user of the digital camera 100 to correct or improve images. Thus, the user may capture an image and display the image on the display 108. If the image seems to be too dark or light, the user may change exposure settings as described above. As the settings are changed, the region 120 of the display 108 displays the numbers of dark and/or clipped pixels based on the changed settings. This display enables a user to determine the number of dark and/or clipped pixels based on new settings.

What is claimed is:

1. A method of calculating pixel values representative of a scene using a single image capture of a digital camera, said method comprising:

focusing light representative of said scene onto a photosensor for a period of time during a single image capture of the digital camera and using at least one exposure setting, said photosensor having a plurality of pixels;

generating numeric values corresponding to the intensity of light received by each of said pixels during said period;

changing said at least one exposure setting on the camera;

calculating pixel values based on the previously generated numeric values and the changed at least one exposure setting; and determining the number of pixel values that are greater than a first pre-selected value.

2. The method of claim 1, and further comprising displaying said number of pixel values that are greater than said first pre-selected value.

3. The method of claim 1, and further comprising displaying the percentage of pixel values that are greater than said first pre-selected value.

4. The method of claim 1, and further comprising determining the number of pixel values that are less than a second pre-selected value.

5. The method of claim 4, and further comprising displaying said number of pixel values that are less than said second pre-selected value.

6. The method of claim 5, wherein said displaying comprises displaying the percentage of pixel values that are less than said second pre-selected value.

7. The method of claim 1, wherein said at least one exposure setting comprises at least one member of the group consisting of aperture size, exposure time, contrast, color balance, gain, and exposure compensation.

8. A method of calculating pixel values representative of a scene using a single image capture of a digital camera, said method comprising:

focusing light representative of said scene onto a photosensor for a period of time during a single image capture of the digital camera and using at least one exposure setting, said photosensor having a plurality of pixels;

generating numeric values corresponding to the intensity of light received by each of said pixels during said period;

changing said at least one exposure setting on the camera;

calculating pixel values based on the previously generated numeric values and the changed at least one exposure setting; and determining the number of pixel values that are less than a first pre-selected value.

9. The method of claim 8, and further comprising displaying said number of determined pixel values that are less than said first pre-selected value.

10. The method of claim 8, and further comprising displaying the percentage of determined pixel values that are less than said first pre-selected value.

11. The method of claim 8, and further comprising determining the number of determined pixel values that are greater than a second pre-selected value.

12. The method of claim 11, and further comprising displaying said number of determined pixel values that are greater than said second pre-selected value.

13. The method of claim 12, wherein said displaying comprises displaying the percentage of determined pixel values that are greater than said second pre-selected value.

14. The method of claim 8, wherein said at least one exposure setting comprises at least one member of the group consisting of aperture size, exposure time, contrast, color balance, gain, and exposure compensation.

15. A digital camera comprising:

a photosensor comprising a plurality of pixels, wherein a numeric value corresponding to the intensity of light incident on each of said pixels during a period is generatable, the light being focused on said photosensor during a single image capture;

at least one adjustable exposure setting, wherein said at least one exposure setting is associated with the light incident on each of said pixels; and a display wherein the number of clipped pixels that would occur, which is calculated based on the previously generated numeric value and a change of said at least one exposure setting, is displayable on said display.

16. The digital camera of claim 15, wherein the number of dark pixels that would occur, which is calculated based on a change of said at least one exposure setting, is displayable on said display.

17. A digital camera comprising:

a photosensor comprising a plurality of pixels, wherein a numeric value corresponding to the intensity of light incident on each of said pixels during a period is generatable, the light being focused on said photosensor during a single image capture;

at least one adjustable exposure setting, wherein said at least one exposure setting is associated with the light incident on each of said pixels; and a display wherein the number of dark pixels that would occur, which is calculated based on the previously generated numeric value and a change of said at least one exposure setting, is displayable on said display.

18. The digital camera of claim 17, wherein the number of clipped pixels that would occur, which is calculated based on a change of said at least one exposure setting, is displayable on said display.

* * * * *